United States Patent
Ting et al.

(10) Patent No.: US 7,254,591 B2
(45) Date of Patent: Aug. 7, 2007

(54) METHOD AND APPARATUS FOR SYNCHRONOUS UPDATING OF MULTIPLE LANGUAGE WEB CONTENT

(75) Inventors: Yi-Mei Ting, Taipei (TW); Chien-Hsing Wu, Taipei (TW)

(73) Assignee: Via Technologies, Inc., Taipei (TW)

( * ) Notice: Subject to any disclaimer, the term of this patent is extended or adjusted under 35 U.S.C. 154(b) by 511 days.

(21) Appl. No.: 10/804,129

(22) Filed: Mar. 19, 2004

(65) Prior Publication Data

US 2005/0010614 A1 Jan. 13, 2005

(30) Foreign Application Priority Data

Jul. 11, 2003 (TW) ............... 92118969 A

(51) Int. Cl.
*G06F 17/30* (2006.01)
*G06F 12/00* (2006.01)

(52) U.S. Cl. .............. 707/200; 707/10; 707/201; 709/223; 709/246

(58) Field of Classification Search ............ 707/2, 707/10, 100, 102, 104.1, 201, 203–204, 200; 709/200, 203, 217, 219, 223–225, 201, 246
See application file for complete search history.

(56) References Cited

U.S. PATENT DOCUMENTS

| | | | |
|---|---|---|---|
| 5,752,042 A * | 5/1998 | Cole et al. ............ | 717/173 |
| 5,919,247 A * | 7/1999 | Van Hoff et al. ........ | 709/217 |
| 6,374,295 B2 * | 4/2002 | Farrow et al. .......... | 709/223 |
| 6,405,219 B2 * | 6/2002 | Saether et al. ......... | 707/201 |
| 6,564,216 B2 * | 5/2003 | Waters ................. | 707/10 |
| 6,711,593 B1 * | 3/2004 | Gordon et al. ......... | 707/204 |
| 6,748,385 B1 * | 6/2004 | Rodkin et al. ......... | 707/10 |
| 6,823,362 B2 * | 11/2004 | Eshghi ................ | 709/203 |

OTHER PUBLICATIONS

Quanzhong Li et al., XVM: A bridge between XML Data and Its Behavior, May 2004,ACM Press, pp. 155-163.*
Airi Salminen et al., Requirement for XML Document Database System, Nov. 2001, ACM Press, pp. 85-94.*
Matthew Harren et al., XJ: Facilitating XML processing in Java, May 2005, ACM Press, pp. 270-287.*

* cited by examiner

*Primary Examiner*—Jeffrey Gaffin
*Assistant Examiner*—Jacques Veillard
(74) *Attorney, Agent, or Firm*—Rabin & Berdo, PC

(57) ABSTRACT

A method for synchronous updating of multiple language web content for use in a primary server and several secondary servers. The method first employs a timer to notify the primary server. The primary server then searches for updated content in web content, composes an updated web content file, and synchronously transmits the updated web content file to the secondary servers in response to the notification. After receiving the updated web content file, the secondary server compiles the updated web content file, codes it by dynamically linking to a language code setting, transfers the updated web content file according to a specific language, and updates web content corresponding to the web content on the primary server using the updated web content file.

12 Claims, 2 Drawing Sheets

METHOD AND APPARATUS FOR SYNCHRONOUS UPDATING OF MULTIPLE LANGUAGE WEB CONTENT

BACKGROUND OF THE INVENTION

1. Field of the Invention

The present invention relates to web content updating technology, and in particular, to an apparatus and method that synchronously updates multiple language web content.

2. Description of the Related Art

An enterprise may have several servers located in different countries, and different server may present web contents in different languages. When web content is updated on a primary server, secondary servers must synchronously update web content to prevent inconsistency. For example, an enterprise has a primary server located in Taiwan and several secondary servers located in Taiwan, China, Japan, and the United States, respectively. The primary server located in Taiwan provides an English website, and the secondary servers located in Taiwan, China, Japan and the United States may display web content in traditional Chinese, simplified Chinese, Japanese, and English, respectively. When a web content is updated on the primary server, the corresponding web content on different secondary servers must be synchronously updated.

Conventionally, there are two methods for updating multiple language web content. In the first method, web content is updated manually and then transferred to secondary servers. This method, while effective, is time-consuming and requires human resources. In the second method, web content is updated manually, then translated into different languages, and directly transferred to corresponding secondary servers. Both the above methods are labor intensive and place a tremendous burden on human resources, particularly for organizations with an extensive web presence spanning several countries and languages. Moreover, the above methods do not provide a method for synchronous updating of multiple language web content.

SUMMARY OF THE INVENTION

Accordingly, the present invention provides an apparatus and method for synchronous updating of multiple language web content.

The present invention is to provide an apparatus and method in which a primary server automatically starts a synchronous updating mechanism.

The present invention provides a method and apparatus for synchronously updating of multiple language web content. According to one embodiment of the invention, the method is suitable for use in a system including a primary server and a plurality of secondary servers, in which the primary server has web content and a timer, and each secondary server has a language code setting and web content corresponding to the web content on the primary server. The method first employs a timer to notify the primary server. The primary server then searches for updated web content, composes an updated web content file, and synchronously transmits the updated web content file to the secondary servers in response to the notification.

After receiving the updated web content file, the secondary server compiles the updated web content file and codes it by dynamically linking to the language code setting. Afterward, the secondary server translates the updated web content file to a specific language used by the secondary server, and synchronously updates the web content with the updated web content file.

According to another embodiment of the invention, the apparatus for synchronous updating of multiple language web content includes a primary server and a plurality of secondary servers, in which the primary server and the secondary servers are located at different locations, and use different languages. The primary server has web content and a timer, and each secondary server has a language code setting and web content corresponding to the web content on the primary server.

The timer triggers a notification message, which is then sent to the primary server. After receiving notification, the primary server searches for updated web content, composes an updated web content file, and synchronously transmits the updated web content file to the secondary servers. After receiving the updated web content file, the secondary server compiles the updated web content file and codes it by dynamically linking to the language code setting. The secondary server then translates the updated web content file from the language used by the primary server into a specific language used by the secondary server, and synchronously updates the web content with the updated web content file.

The language code setting determines the language to be displayed by the web content. For example, BIG 5 displays traditional Chinese, ISO displays Europe languages, and GB2312 displays simplified Chinese, and others.

The above-mentioned method may take the form of program code embodied in a tangible media. When the program code is loaded into and executed by a machine, the machine becomes an apparatus for practicing the invention.

BRIEF DESCRIPTION OF THE DRAWINGS

The aforementioned contents, features and advantages of the invention will become apparent by referring to the following detailed description of the preferred embodiment with reference to the accompanying drawings, wherein.

DETAILED DESCRIPTION OF THE INVENTION

Figure 1:
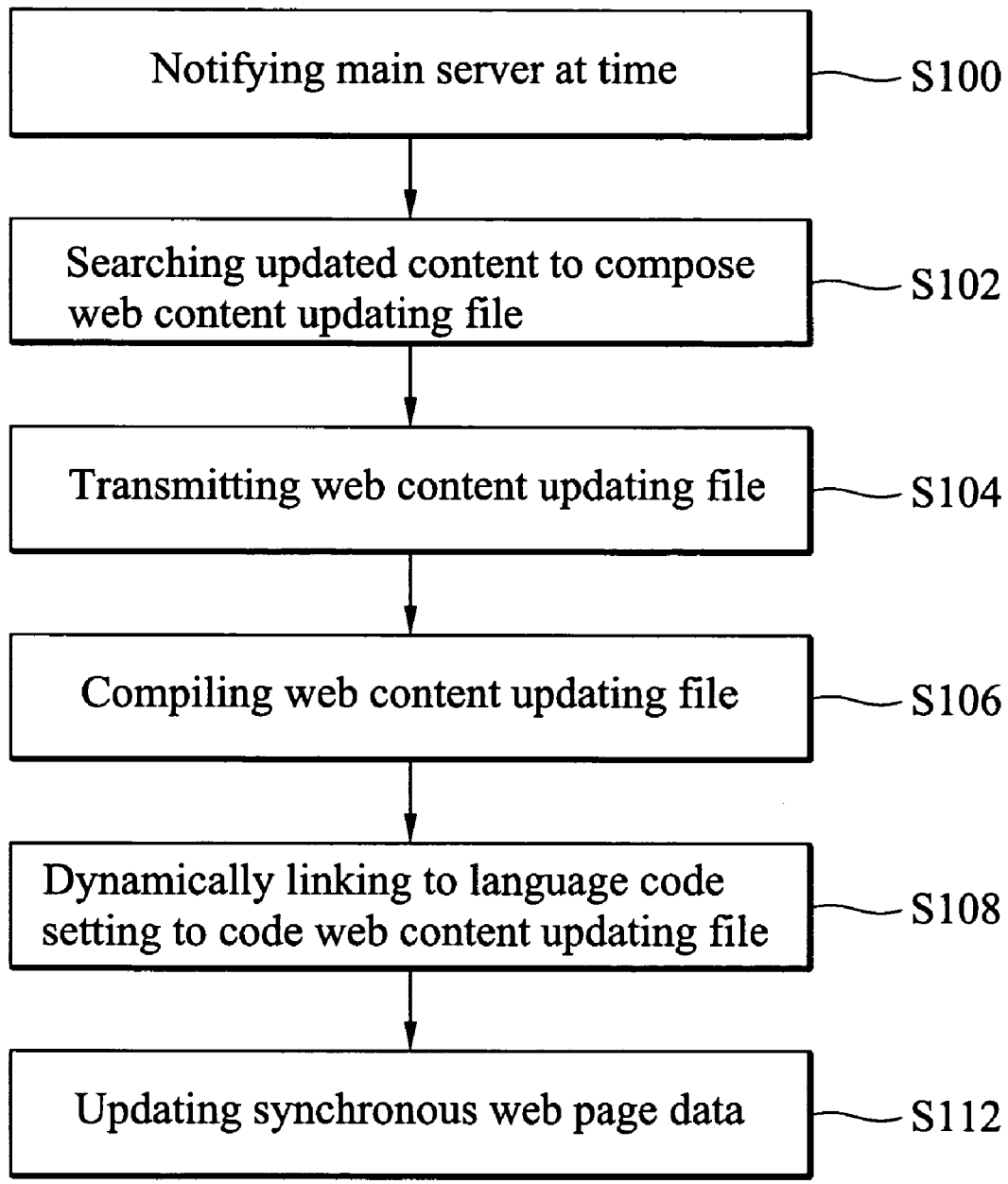
FIG. 1 is a flowchart showing the process of the method for synchronous updating of multiple language web content according to the present invention.

FIG. 1 shows the process of the method for synchronous updating of multiple language web content according to one embodiment of the present invention. The method for synchronous updating of multiple language web content according to the present invention is suitable for use in a system including a primary server and several secondary servers. The primary server includes web content and a timer, in which the web content may comprise at least one file based on a specific format recognized by a browser. For example, the web content may follow the HTTP (hypertext transmission protocol) and be recognized by the web browser. The web content may be updated periodically or irregularly. The timer notifies the primary server to search for updated web content. Each secondary server has a language code setting and web content corresponding to the web content on the primary server. Similarly, the web content may comprise at least one file based on a specific format recognized by the browser.

The primary server (step S100) is first notified by the timer. After receiving notification, the primary server searches for updated web content, and composes an updated web content file. The updated web content file is then compressed (step S102), and synchronously transmitted to the secondary servers (step S104).

Each secondary server then compiles the received updated web content file (step S106), and codes it by dynamically linking to the language code setting (step S108). Thereafter, each the web content on each secondary server is modified based on the updated web content file (step S112). In step S112, each secondary server may first transfer the updated web content file according to a specific language used in the secondary server, and the web content is then modified based on the updated web content file.

Figure 2:
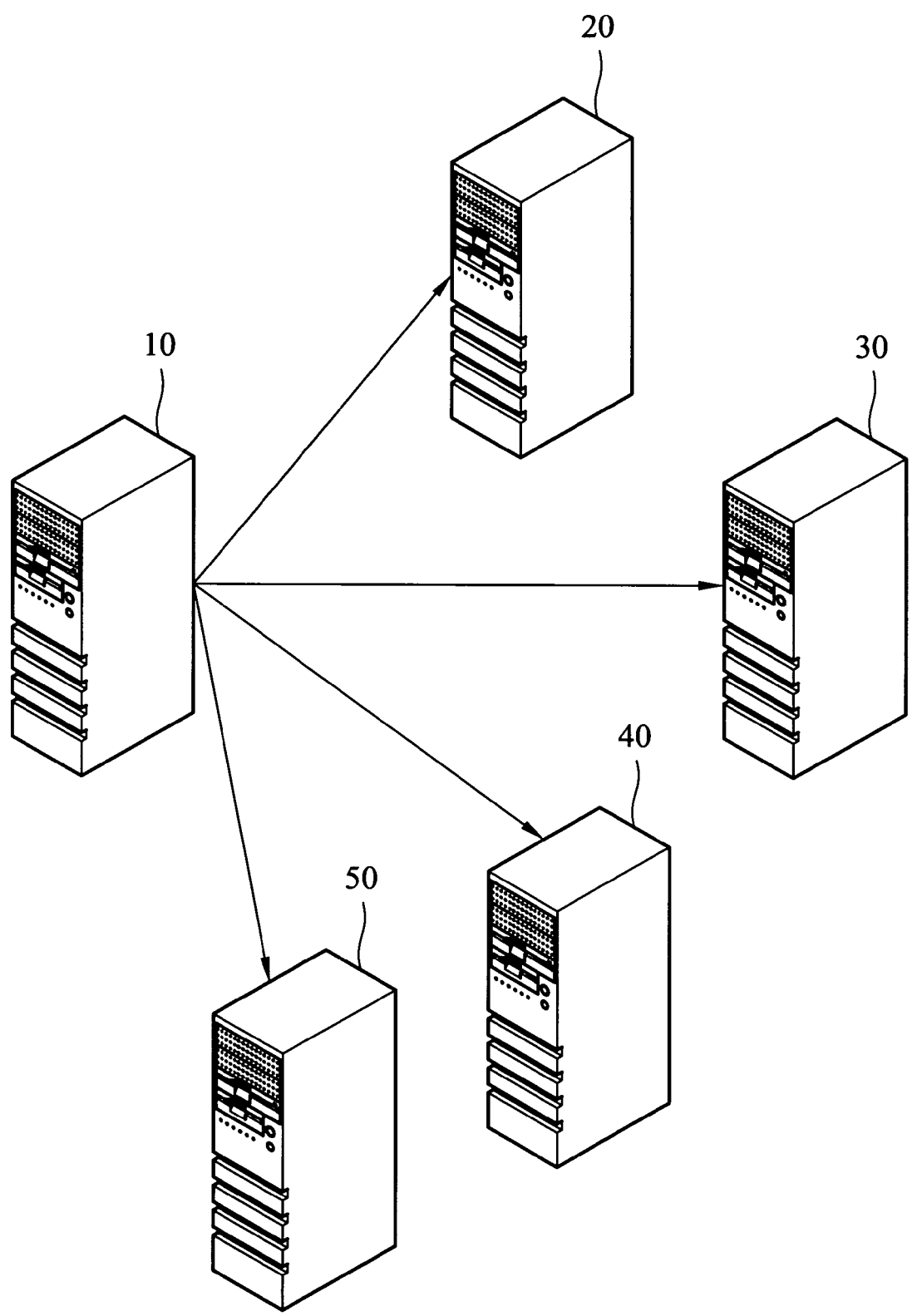
FIG. 2 is a schematic diagram illustrating the architecture of the apparatus for synchronous updating of multiple language web content according to the present invention.

FIG. 2 illustrates the architecture of the apparatus for synchronous updating of multiple language web content according to another embodiment of the present invention. The apparatus includes a primary server 10 and several secondary servers 20, 30, 40, and 50.

The primary server 10 includes web content and a timer, in which the web content may comprise at least one file based on a specific format recognized by a browser, and the web content may be updated. The timer notifies the primary server periodically to search for updated web content, compose an updated web content file, and transmit the updated web content file.

Each secondary server 20, 30, 40, and 50 has a language code setting and web content corresponding to the web content on the primary server 10, in which the web content may comprise at least one file based on a specific format recognized by the browser. Each secondary server may receive the updated web content file from the primary server 10, compile the updated web content file, and code it by dynamically linking to the language code setting, such that the updated web content file can be displayed on the secondary server, and the web content can be modified based on the updated web content file. Similarly, each secondary server 20, 30, 40, and 50 may further transfer the updated web content file from a language used on the primary server 10 into a specific language used on the secondary server, and modify the web content based on the transferred updated web content file.

For example, if an enterprise has a primary server 10 and several secondary servers, in which the primary server 10 located in Taiwan provides an English website, and the web content, such as product information is updated, and the secondary servers located in Taiwan, China, Japan and the United States provide websites in traditional Chinese, simplified Chinese, Japanese and English, respectively. Each secondary server has its corresponding language code setting, for example, the website in traditional Chinese is BIG 5, the website in simplified Chinese is GB2312, and the website in English is ISO. Each secondary server has web content corresponding to the web content on the primary server 10, in which the web content may comprise at least one file recognized by the browser.

The timer notifies the primary server 10, and directs the primary server 10 to search for updated web content, to compress the updated web content file, and to transmit the updated web content file to the secondary servers 20, 30, 40 and 50. It is noted that only the updated portion of the web content is searched and transmitted, hence only a portion of the web content is sent, thus reducing network bandwidth consumption and saving.

After receiving the updated web content file, the secondary server 20 compiles and codes the updated web content file by dynamically linking to the language code setting, such that the updated web content file can be displayed in traditional Chinese by the BIG 5 code, and synchronously updates the web content with the updated web content file. Additionally, the secondary server 20 may further translate the updated web content file into traditional Chinese.

The secondary server 30 compiles the updated web content file, and codes it by dynamically linking to the language code setting of simplified Chinese, and transfers the updated web content file into simplified Chinese by the GB 2312 code and synchronously updates the web content with the updated web content file. The web content updating processes for the secondary servers 40 and 50 are similar, however, the secondary servers 40 and 50 may code the updated web content file using their respective language code (such as ISO code) setting, and transfer the updated web content file into their respective language, such as Japanese or English. Since the web content updating message is transmitted synchronously, there is no time lag between secondary servers.

As a result, the present invention provides an apparatus and method that employs a primary server automatically start a mechanism to synchronously update multiple language web content for, thereby achieving the goal of the invention.

The method and system of the present invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The method and systems of the present invention may also be embodied in the form of program code transmitted over a transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to application specific logic circuits.

Although the present invention has been described in its preferred embodiments, it is not intended to limit the invention to the precise embodiments disclosed herein. Those skilled in this technology can still make various alterations and modifications without departing from the scope and spirit of this invention. Therefore, the scope of the present invention shall be defined and protected by the following claims and their equivalents.

What is claimed is:

1. A method of synchronously updating of multiple language web content, comprising the steps of:

providing a primary server and a plurality of secondary servers, in which the primary server has first web content in a first language and a timer, and each secondary server has a language code setting and second web content corresponding to the first web content on the primary server in a respective one of a plurality of second languages;

notifying the primary server by the timer such that the primary server searches for updated web content in the first web content, composes an updated web content file accordingly, and synchronously transmits the updated web content file as a compressed data file from the primary server over a network to the secondary servers in response to notification;

compiling updated web content files at the secondary servers, and coding the updated web content file of each secondary server by dynamically linking to the language code setting of that secondary server;

translating the updated web content file of each secondary server from the first language into the respective one of the second languages; and updating the second web content on each secondary server based on its updated web content file.

2. The method as claimed in claim 1 wherein the first web content comprises one file based on a specific format recognized by a browser.

3. The method as claimed in claim 1 wherein the second web content comprises one file based on a specific format recognized by a browser.

4. A method for synchronous updating of web content for use in a secondary server having a language code setting and second web content in a second language, comprising the steps of:

receiving an updated web content file over a network, the updated web content file being a compressed data file;

compiling the updated web content file, and coding the updated web content file by dynamically linking to the language code setting;

translating the updated web content file from a first language into the second language; and updating the second web content using the updated web content file.

5. The method as claimed in claim 4 wherein the updated web content file is received from a primary server.

6. The method as claimed in claim 4 wherein the second web content comprises at least one file based on a specific format recognized by a browser.

7. An apparatus for updating web content, comprising:

a primary server having first web content in a first language and a timer, the primary server searching for updates in the first web content, composing an updated web content file accordingly, and transmitting the updated web content file as a compressed data file in response to a notification from the timer, the updated web content file being transmitted over a network; and a plurality of secondary servers, each of which has a language code setting and second web content corresponding to the web content on the primary server in a second language, to receive the updated web content file from the primary server, compile the updated web content file, code the updated web content file by dynamically linking to the language code setting, translate the updated web content file from the first language into the second language, and update the web content based on the updated web content file.

8. The apparatus as claimed in claim 7 wherein the first web content on the primary server comprises at least one file based on a specific format recognized by a browser.

9. The apparatus as claimed in claim 7 wherein the second web content in the secondary server comprises at least one file based on a specific format recognized by a browser.

10. A machine-readable storage medium storing a computer program which when executed causes a computer to perform a method of synchronous updating of web content for use in a secondary server having a language code setting and second web content in a second language, said method including the steps of:

receiving an updated web content file over a network, the updated web content file being a compressed data file;

compiling the updated web content file, and coding the updated web content file by dynamically linking to the language code setting;

translating the updated web content file from a first language into the second language; and updating the second web content based on the updated web content file.

11. The storage medium as claimed in claim 10 wherein the updated web content file is received from a primary server.

12. The storage medium as claimed in claim 10 wherein the second web content comprises at least one file based on a specific format recognized by a browser.

* * * * *